May 2, 1967
R. P. FRITH ETAL
3,316,761
RECORDING ANEMOMETERS
Filed Oct. 24, 1963
4 Sheets-Sheet 1
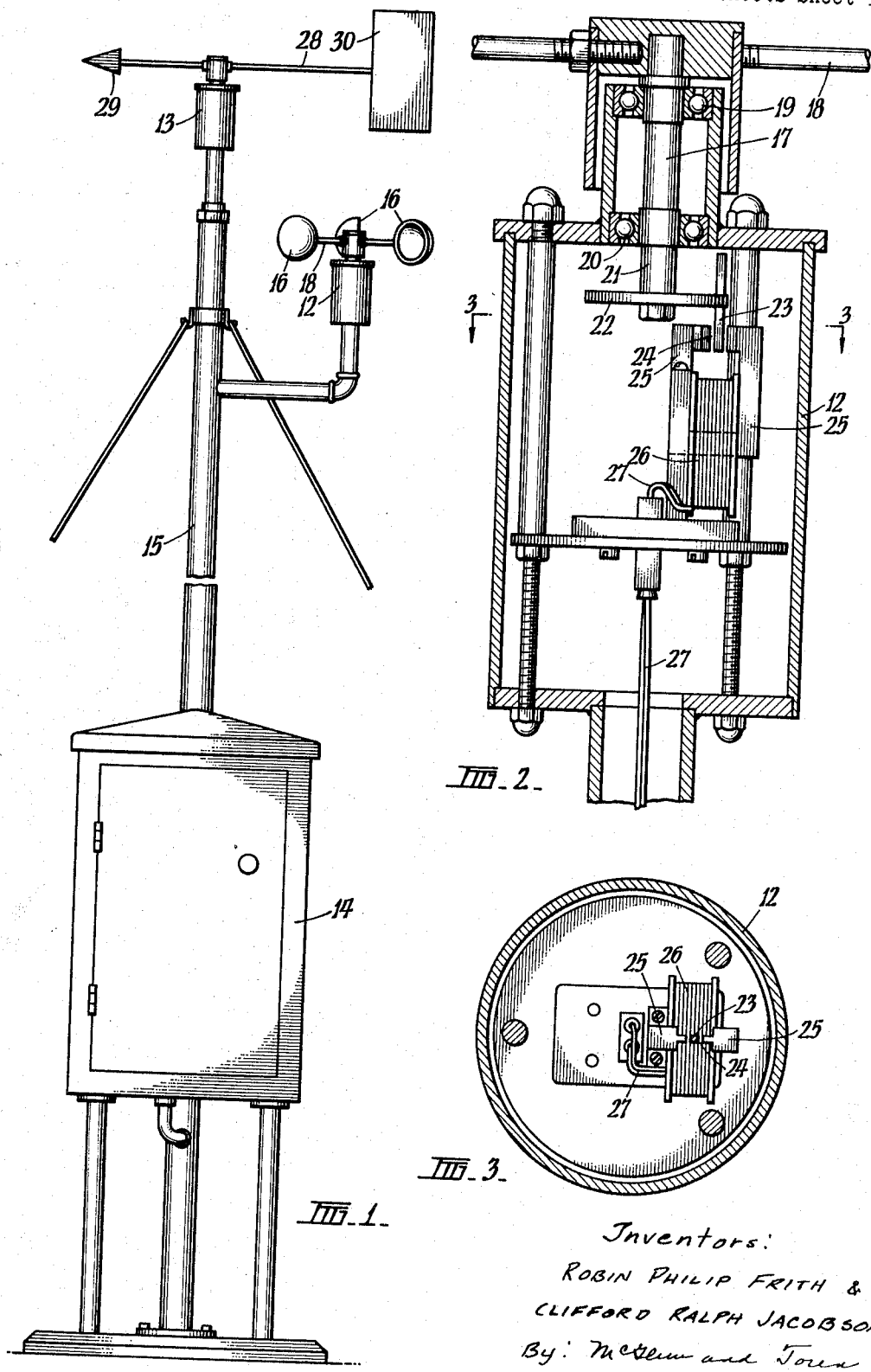
Inventors:
ROBIN PHILIP FRITH &
CLIFFORD RALPH JACOBSON
By: McGlew and Toren
Attorneys Inventors:
ROBIN PHILIP FRITH &
CLIFFORD RALPH JACOBSON
By: McGrew and Toren
Attorneys

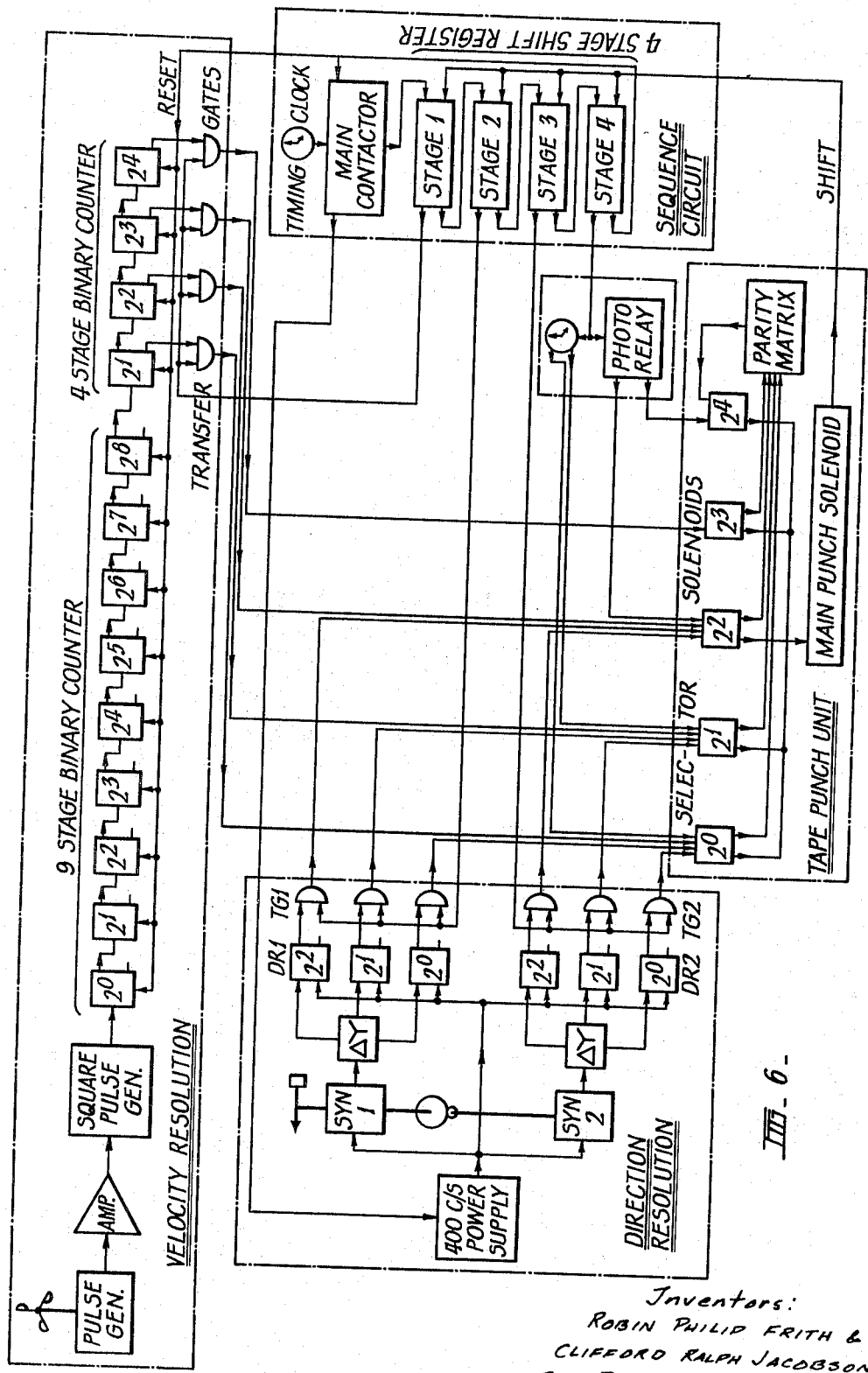

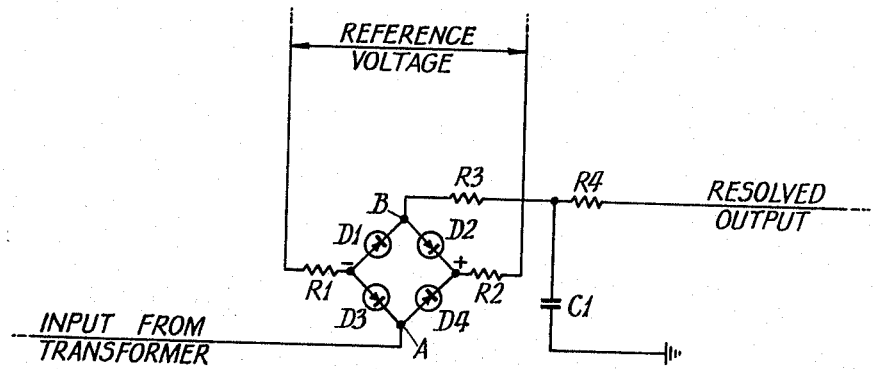
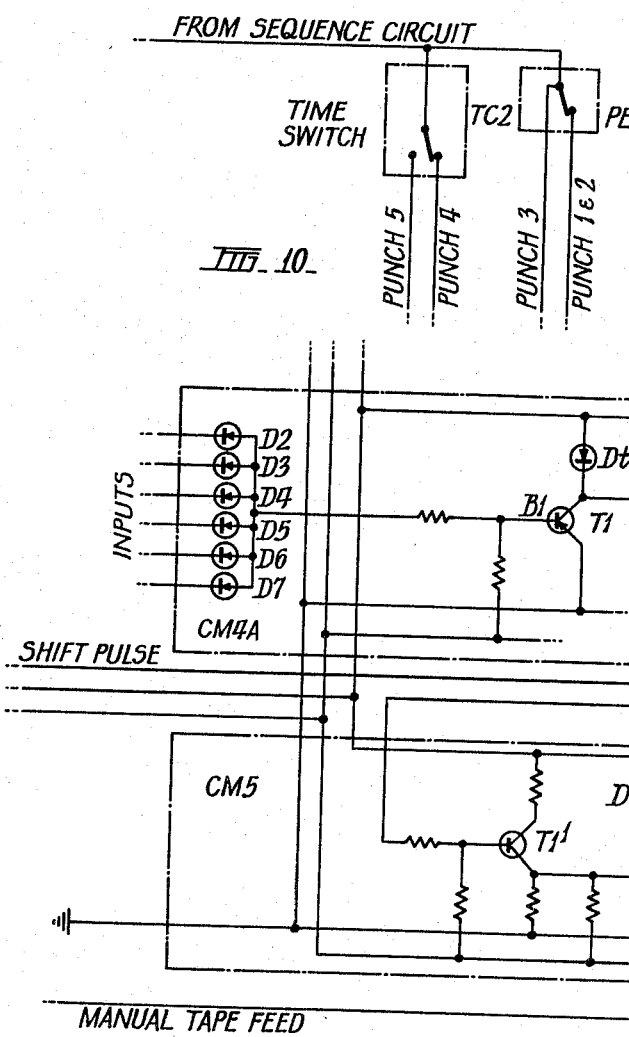

United States Patent Office 3,316,761
Patented May 2, 1967

3,316,761
RECORDING ANEMOMETERS
Robin Philip Frith, Melbourne, Victoria, and Clifford Ralph Jacobson, Ferntree Gully, Victoria, Australia, assignors to Commonwealth of Australia, Department of Civil Aviation, Melbourne, Victoria, Australia
Filed Oct. 24, 1963, Ser. No. 318,630
Claims priority, application Australia, Oct. 26, 1962, 23,609/62
12 Claims. (Cl. 73—189)

This invention relates to anemometers and in particular to recording anemometers which are adapted to measure wind force or speed and wind direction either at regular periodic intervals or continuously, and record these readings for subsequent evaluation.

The most common presently used apparatus for recording this information is the so-called Dines recording anemometer, which is adapted to record the wind direction and speed on a 24 hour chart by means of an ink stylus. The chart is carried past the stylus by means of a rotating drum, which is actuated by a clockwork mechanism. The direction of the wind is measured by a vane or like device, which is linked mechanically to the stylus, which thus records the changes in wind direction. The wind speed is measured by means of Pitot tubes, and the pressure difference measured by these tubes is transmitted through a pressure controlled float device which in turn is linked to the stylus.

One of the disadvantages of this type of apparatus is that the wind speed recording linkage from the Pitot tubes to the stylus is very prone to sticking and mechanical troubles. The main disadvantage, however, is inherent in the use of an ink stylus for recording. The stylus must be cleaned every day and the ink supply replenished; the chart must also be changed very day and the clockwork mechanism rewound. Despite the fact that the stylus is cleaned regularly, it is found in practice that the ink often runs on the chart, unless the stylus meets the chart at precisely the correct angle. Another disadvantage is that the ink supply to the stylus may clog or thicken up, whereupon the mark left by the stylus on the chart may become almost indistinguishable.

A further major disadvantage is found in the analysis of the information recorded on the charts. The anemometer charts, as obtained from presently used equipment, are perused by analysts, who select hourly average readings of wind force and direction and transfer these readings on to punched cards, i.e. approx. 17,500 readings have to be punched manually to analyse a year's information from one anemometer. These cards are then stored, grouped and processed in computers.

One of the objects of the invention is to provide an improved recording anemometer which does not require maintenance or other attention, such as chart changing, as frequently as presently used equipment, such as the Dines instrument referred to above.

A further object of the invention is to provide a recording anemometer which is adapted to store the recorded information in the minimum possible space.

Another object is to provide a recording anemometer wherein the recorded information is stored in a form suitable for immediate analysis in a normal or standard electronic digital computer.

A still further and more particular object of the invention is to provide an anemometer which records its readings in binary code by means of punched holes in a so-called "five-hole" computer tape.

Other objects and aims of the invention will become apparent from the ensuing description.

According to the invention there is provided an anemometer comprising means to measure wind speed and detect wind direction, means to transduce the measured wind speed readings into electrical impulses the numbers of which are proportional to said readings, means to transduce the detected wind direction indications into coded voltages representative of said indications, binary counters adapted to count the impulses at predetermined intervals in such a way that the numbers of impulses counted are proportional to the average value of the readings over said intervals, analysing circuits adapted to resolve the coded voltages to give a representation of the wind direction at the end of said intervals, and means to record the numbers of impulses counted and the resolved coded voltages on a tape or other recording medium for analysis in a digital computer or the like.

Preferably the means to measure wind speed comprises a set of rotatable vanes, and the means to transduce the wind speed reading obtained from the vanes into electrical impulses is a pulse generator which is driven by the vanes and is adapted to generate pulses at a rate proportional to the wind speed.

Preferably also the means to detect wind direction is a direction vane which is mounted on a rotatable shaft, and the means to transduce the wind direction indications into coded voltages comprises a pair of selsyn motor transmitters, the first of which is coupled to the shaft of the direction vane, while the second selsyn is coupled thereto through a reduction gear mechanism, whereby alternating and varying voltages are generated in each of the three windings of each selsyn whenever any movement of the direction vane takes place, the arrangement being such that algebraic signs of the voltages appearing on the windings of the first selsyn at any given instant, with respect to a reference voltage, provide an indication of the sextant in which the direction vane is pointing at that instant, and the algebraic signs of the voltages appearing on the windings of the second selsyn at said instant indicate the 10° segment of the said sextant in which the direction vane is then pointing.

Preferably too the means to record the numbers of impulses are a series of punches, which are actuated by the final stages of the binary counters and are adapted to punch holes in the tape, thereby recording the readings and indications of the anemometer in binary code thereon.

For a more complete understanding and appreciation of the invention a practical embodiment thereof is now described with reference to the accompanying drawings, in which:

FIGURE 1 is a diagram showing the entire anemometer installation in use;

FIGURE 2 is a cross-section of the so-called "velocity-head," i.e. the wind speed measuring device;

FIGURE 3 is a section along line 3—3 in FIGURE 2;

FIGURE 6 is a block diagram of the entire anemometer;

FIGURE 9 is a circuit diagram of the voltage comparison circuit of the direction resolution system;

FIGURE 10 is a circuit diagram of the check-digit circuit; and

FIGURE 11 is the electrical circuit of the tape punching mechanism.

*General description*

Figure 4:
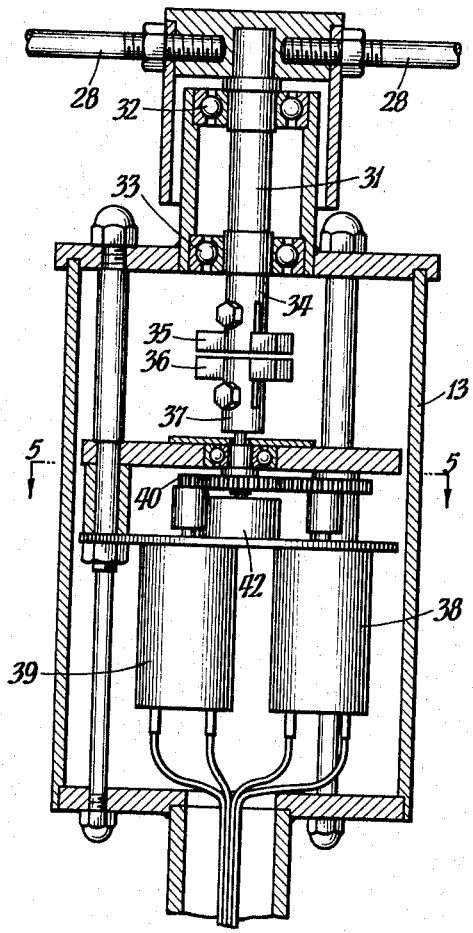
FIGURE 4 is a cross-section of the direction head of the anemometer.
Figure 5:
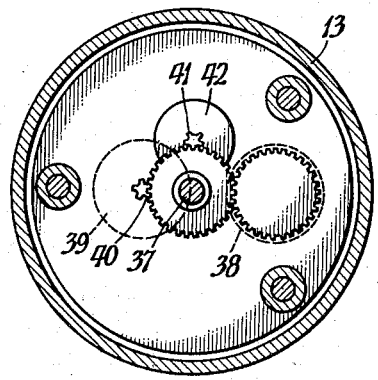
FIGURE 5 is a cross-section along the line 5—5 in FIGURE 4.

The anemometer as shown in FIGURE 1, consists of a velocity head 12, a direction head 13 and a unit containing the electronic counting and direction analysing equipment and the tape punching mechanism which is housed in the cabinet 14 at the base of the mast 15 on which the sensing heads are mounted. The principle embodied is that the velocity head generates pulses which are counted over a 10 minute period and the resultant reading of speed is punched into the tape in a binary code. At the same time direction is sensed by analysing the output voltages on the windings of two selsyn motor transmitters which are incorporated in the direction head. This information is also punched into the tape at the end of each 10 minute period. The wind force or speed is recorded in increments of 6 knots up to 54 knots (this being higher than the expected average over 10 minutes at any time) and the direction is recorded in increments of 10 degrees. The speed reading is punched in a straight binary code in the FIGURES 1 to 9, each requiring to be multiplied by 6 to give actual velocity, while direction indication is punched in a decimal binary code requiring one line of holes to record the tens digit and a second line to record the units digit. In the case of direction the numbers punched bear no direct relation to the direction indicated but must be converted using a conversion table. After the second digit of direction, a "check" digit is punched. This provides a start point for the computer to read each set of readings and indicates whether the reading was taken at night or day and before or after midnight and midday respectively.

The velocity head

The velocity head 12 consists of three cup shaped vanes 16 mounted radially about a vertical shaft 17 on arms 18 which are approximately 9 inches long. The shaft 17 is carried on a pair of sealed and lubricated for life ball bearings 19, 20 which are adequately shrouded against the ingress of moisture and weather. The lower end 21 of the shaft 17 carries a bakelite disk 22 in the edge of which is mounted a small slug 23 of high permeability magnetic material. At each revolution of the shaft 17 the slug 23 passes through the air gap 24 of a magnetic circuit of a permanent magnet 25 and momentarily increases the flux. This induces a small pulse into a coil 26 wound around the magnet 25 (approx. 48,000 turns of 46 gauge wire), and these pulses are conveyed by the conductors 27 to the velocity counting section of the electronic equipment and counted there.

The whole of the velocity head is constructed of non-ferrous materials and is designed to promote long and trouble free life. The vanes are designed so that the shaft makes 512 revolutions in 10 minutes in a constant wind velocity of 6 knots (512 being 2 to the power 9, and hence a convenient figure for counting in a binary counter).

The velocity counter

The pulses as received from the velocity head are sharply peaked with a width of approximately 3 electrical degrees (2 milliseconds at 10 knots) and with a peak voltage of approximately 300 milli-volts at one knot and rising to a maximum of approximately 10 volts at 40 knots. These pulses are fed into a single stage amplifier (see FIGURE 6) and then actuate a Schmitt trigger circuit to generate pulses of substantially square wave form with a peak voltage of approximately 8 volts.

Figure 7:
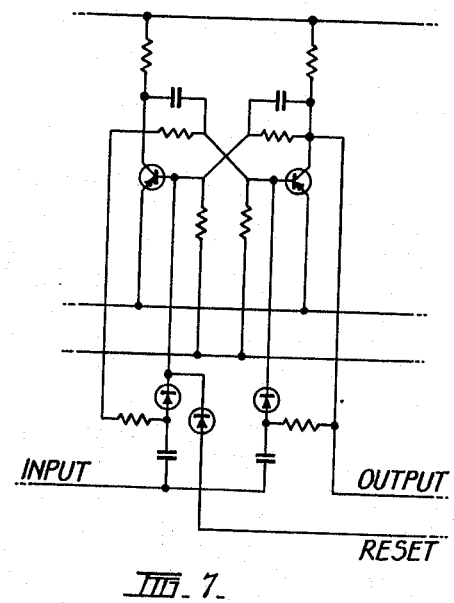
FIGURE 7 is a circuit diagram of a typical counting module of the velocity counter.
Figure 8:
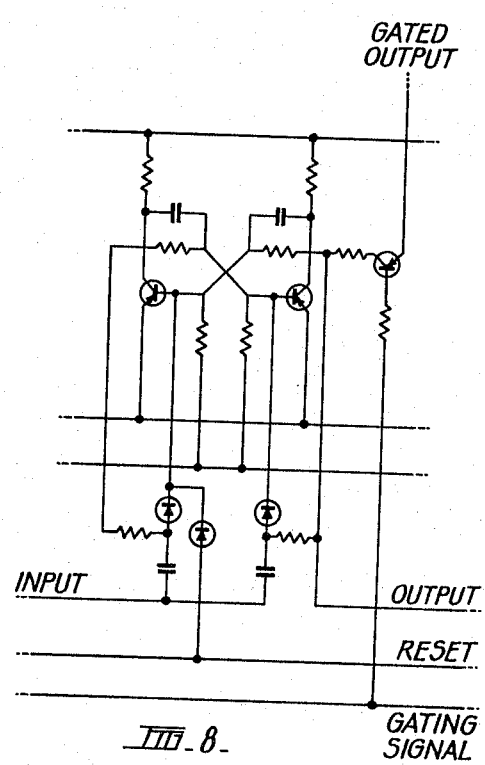
FIGURE 8 is a circuit diagram of a counting module with gated output, as used in the final stages of the velocity counter.

The square pulses are then fed into a nine-stage binary counter, each stage being an identical flip-flop (bistable) circuit of the type shown in FIGURE 7, with its input, output and resetting connections and being mounted on individual "plug in" modules. At the start of each 10 minute period a resetting pulse is transmitted from the sequence circuit (see later) to each element of the binary counter, setting all to zero. The square pulses are then fed in to the counter and, assuming that the average wind force or velocity is greater than 6 knots, the count will proceed until the 9th element (i.e. 512 pulses) is reached. This then feeds a pulse into the first stage of a further binary counter, which is shown in FIGURE 8, having four identical stages similar to those of the 9 stage counter, but having an additional output controlled by a transistor gate and having a gating connection from the sequence circuit (described later). In these stages the output of the bistable circuit of FIGURE 7 is connected to the collector of the gate transistor, so that when this module is operated the collector is negative; the transistor is then ready to conduct when negative voltage is applied to the base by the sequence circuit. The emitter is connected to the respective punch selection solenoid (see FIGURE 6) in such a way that, when the gate transistor on the counting module conducts, the punch selection solenoid is operated.

If, for example a wind is in the range say 18 to 24 knots, the binary counter will have cycled through its 512 pulses three times at the end of the 10 minute period and the four stage counter will have received three pulses so that it will be set with its first and second flip-flops actuated. This means that the sequence circuit will cause the first two punches to operate and punch binary three into the tape, representing 3 x 6 = 18 knots.

The direction head

The direction head 13 embodies a wind vane 28, which is approximately 30 inches long, having a pointed nose 29 and aerofoil tail 30. The vane is mounted on a vertical shaft 31 carried on sealed bearings 32, 33 as in the velocity head and the unit is similarly weather-proofed and of similar external appearance. The lower end 34 of the shaft 31 carries a permanent magnet 35 which moves above an identical magnet 36; this provides a magnetic coupling to the shaft of a selsyn transmitter 38 which is mounted below the main shaft 37 of the unit. Mounted beside this selsyn is an identical unit 39 which is connected via gearing 40 to the first selsyn 38 through a ratio of 6 to 1. Also geared to the main shaft 37 is a further shaft 41, driving a small "disk in oil" damping device 42. Thus we have one selsyn (38) which is tending to move with the vane 28, a second (39) which is moving through angles six times that travelled by the first and a damping disk also travelling six times as fast as the first selsyn. By virtue of the magnetic coupling 35–36 directly beneath the vane 28 and the damping device 42, the peaks of oscillation of the vane are eliminated and the selsyn arrangement tends to follow the mean position of the vane rather than the extreme positions.

A selsyn transmitter is, in fact, a single phase transformer having three secondary windings and a common primary, with the primary arranged on a shaft so that it may be rotated in relation to the three secondary windings. The three secondary windings are arranged on the core so that each is physically displaced from its neighbour by an angle of 120 degrees. The result is that, as the primary is slowly rotated, the voltage of each of the secondaries is in turn raised to a maximum, then gradually reduced to zero and then increased to a maximum negative A.C. value. However, it should be noted that the voltages always remain in the phase with the voltage on the primary, and it is only the numerical value of the voltages which change from maximum positive, through zero, to maximum negative values with respect to the primary voltage. It can be seen then that for any position of the vane (and hence of the selsyn primary), two of the secondary windings will be carrying voltages positive with respect to the primary and one negative with respect to the primary or, alternatively, one will be carrying a positive voltage and the other two carrying negative voltages. At no time will all secondary voltages be positive or all secondary voltages negative. Hence, as the primary rotates, six separate combinations of voltage appear on the secondaries, i.e. 1 only positive, 1 and 2 positive, 2 only positive, 2 and 3 positive, 3 only positive and 3 and 1 positive. By noting which of the windings carry positive or negative voltages we can determine the direction in which the primary lies (and, consequently, the direction in which the vane points, or rather in which 60 degree sector, i.e. sextant, of direction the vane is pointing).

As we have a second selsyn transmitter geared to the first in the ratio of 6 to 1 we can, by analysing the voltages on its secondary windings, tell in which sixth of the 60 degree sector of rotation the vane lies. Thus by noting the results from the two selsyns we can break the direction of rotation down into 36 equal sectors, each of 10 degrees arc.

*The direction analysing circuit*

In order to simplify the task of determining which of the windings carry voltages which are positive with respect to the primary voltage, it is necessary to establish a voltage with respect to earth for each secondary winding. As the secondary windings are totally sealed and a star point is therefore not accessible, the system is stabilised with respect to earth by feeding the output of the selsyn into a delta-star connected group of single phase transformers. It should be noted that this does not give a three phase output, but still gives three single phase outputs all of which are in phase but any one of which may be negative with respect to any other.

The voltage comparison circuit for determining which of the windings carry the positive or negative voltages is shown in FIGURE 9. The reference voltage, taken from the terminals of the primary winding of the selsyn, is fed via two resistors through a half wave rectifier comprising four individual diodes connected in series parallel. Thus during the forward half cycle of the primary voltage, current may flow through the rectifier, but during the reverse half cycle the diodes are shut off by a comparatively large reverse voltage; however, the secondary voltage is connected between points A and B on this rectifier network, and consequently secondary current also can flow only during the forward half cycle of the primary voltage. This means that the secondary current also undergoes half wave rectification (for it is in phase with the primary), but the direction of D.C. current flow will depend on whether the secondary voltage is positive or negative during the forward half cycle of the primary voltage, e.g. if the secondary voltage is positive during the positive or forward half cycle of the primary, the current flow will be via diode D4, through the resistor R2, through the primary winding of the selsyn back through resistor R1, diode D1, and on through the load resistors R3, R4 to earth; hence a positive, half wave rectified, D.C. current will flow. If, on the other hand the secondary voltage is negative at this half cycle, then the current flow will be from earth through the load resistors R4, R3, through diode D2, resistor R2, the primary winding, resistor R1, diode D3, and back to the secondary winding and consequently a negative half wave rectified D.C. current will flow. By providing such a rectifier network for each of the three secondary voltages of each of the two selsyns it is possible to determine which of the secondary windings carry positive or negative voltages.

The output from each of these three rectifier networks is then used to control a separate bistable circuit so that, when the voltage is positive, one half of the circuit will conduct, and when it is negative this half is cut off, allowing the other half to conduct. Thus, when the voltage is negative, a negative voltage is made available at the output of that bistable circuit. The banks of rectifier networks and their associated bistable circuits for each selsyn are indicated collectively at DR1 and DR2 in FIGURE 6. A gate transistor is provided on each of these bistable circuit modules. In FIGURE 6 the gate transistors for the rectifier networks of the first selsyn are indicated collectively by TG1, while those associated with the rectifier networks of the second selsyn are indicated collectively by TG2. As in the case of the velocity circuit, the output of each bistable circuit is connected to the collector while the emitter of the transistor is connected to the appropriate punch circuit in such a way that when the transistor conducts, this punch sets up ready to perforate the tape. The base is held more positive than the emitter by a connection to the sequence circuit so that the gate cannot conduct until commanded to by the sequence circuit.

An identical set of circuits are provided for the second selsyn which rotates six times for each revolution of the first, and each selsyn is arranged so that if winding number 1 is negative, a hole is punched in row 1 of the tape, if winding number 2 is negative a hole is punched in row number 2, and if winding number 3 is negative a hole is punched in row number 3.

The sequence of operation is that each *negative* winding prepares its gate transistor ready for the sequence circuit to connect it to its punch. At the appropriate time the sequence circuit energises these transistors and causes them to conduct; this energises the respective punch selection solenoids, and the main punch operates, perforating the first line of holes to indicate the 60 degree sector in which the direction vane lies. The sequence circuit then moves on one step and causes those gate transistors of the second selsyn which are connected to negative windings to conduct; this sets up a new combination of punch selecting solenoids and the main punch solenoid again operates, perforating a second line of holes which indicate in which sixth of that 60 degree sector the vane lies.

*The 400 c.p.s. power supply*

The power supply is a conventional phase-shift oscillator with push-pull output giving an output of 400 c.p.s. 1 watt at 110 volts; input is 125 milliamps at 10.8 volts. The power supply is controlled by a switching transistor which is normally held not operating by a positive voltage applied to its base, but at the appropriate time a negative signal from the sequence circuit causes this transistor to conduct and the power supply is switched on. After approximately 1 second, during which the direction selsyn circuits set up their gate transistors, the sequence circuit turns the base of the power supply switching transistor more positive and it stops conducting and so switches the power supply off. This means that the power supply is on only for approximately 1 second during each 10 minutes thus greatly conserving battery capacity. The output from the power supply is fed directly to the primary winding of the two selsyns and also to the voltage comparison circuits associated with the two selsyns.

*The check digit circuit*

The check digit, as mentioned earlier, is a character punched into the tape to provide a separation between readings, and at the same time to indicate whether the reading was taken in daylight hours or after dark. In addition, at midday and midnight the character punched is changed, so that the computer analysing the tape may separate readings into four groups; i.e. dawn to midday, midday to dusk, dusk to midnight and midnight to dawn. The daylight/darkness reading is controlled by a photoelectric relay which is shown in FIGURE 10 in the energised state, indicating darkness. When de-energised, the relay completes a circuit to punch number 3 and when energised completes also the circuits to punches number 1 and 2. The midday/midnight indication is controlled by the 12 hour dial of the clock which provides the ten minute timing pulses, and at midday and midnight a contact changes over so that before midday the circuit to punch number 4 is closed, as in FIGURE 10, while after midday the circuit to punch No. 5 is closed.

Thus in daylight hours before midday punches number 3 and 4 are set up, in night hours before midnight punches number 1, 2, 3 and 4 are set up, in daylight hours after midday punches number 3 and 5 are set up and in night hours after midnight number 1, 2, 3, and 5 are set up.

The sequence circuit

The sequence circuit is energised each ten minutes by contacts of a small electric time switch, powered by a single torch cell which gives the clock an operating life of six to nine months. As the anemometer is designed for installation in remote locations where electric power is not available, it is operated by nickel cadmium accumulators and, to extend the period between battery changes, the direction circuit is left de-energised except immediately before sampling the readings; consequently the first function of the sequence circuit is to turn on the 400 cycle power supply which operates the primaries of the selsyns, in order that wind direction may be sampled. At the same time the direction analysing circuit is switched on so that the appropriate gate transistors associated with the two selsyns are set up. After approximately 1 sec. the 400 cycle power supply is switched off, leaving the direction circuit on, so that the gate transistors remain set up. All velocity, direction and check digit gate transistors are now set up and the punching sequence is ready to begin.

The sequence circuit then performs the following functions in order:

(a) It gates the output from the four stages of the main binary counter of the velocity circuit to the punch selector solenoids, so that those counters which have been actuated will prepare their punches for perforating. The main punch solenoid then operates, punching one line of holes and, as it returns, shifts the tape forward one line and at the same time moves the sequence circuit on to its second function.

(b) This is to energise the gating circuits of the first selsyn so that appropriate punch solenoids are selected. The main punch solenoid then operates, again punching a line, shifting the tape on as it returns and moving on to the next function.

(c) Step 3 is to command the gate transistors of the second selsyn to conduct, again resetting the punch circuits and energising the main punch.

(d) The sequence then moves on to punch the fourth line which indicates firstly whether it is day or night and secondly whether before or after midday.

The direction circuit and sequence circuit are then switched off and remain off until the time switch has broken its circuit and then remade it at the end of the next 10 minutes. The velocity circuit, of course, remains energised so that it may count pulses over the full 10 minute period but all of its binary counters are reset to zero at the completion of the punching sequence.

The tape punch unit

The punch unit is developed from a standard teletype tape perforation unit and most of the mechanical parts are actually of teletype origin. In the normal tape perforation unit the main punch solenoid is situated beneath a series of small blocks which are pushed forwards or back by the actuation of the teletype keys, i.e. when any key is depressed on the typewriter keyboard the appropriate blocks are mechanically pushed forward so that they are under those punches which it is desired to push through the paper tape. The main solenoid then operates, pushing all blocks up, but only those that have been pushed under punches perforate the tape. In the anemometer punch unit the links to these blocks have been attached to small solenoids so that, when it is desired to punch a hole in a particular row in the tape, the appropriate solenoid must be energised pushing that block forward. Thus we have a punch block with 5 main punches and a sprocket hole punch; beneath the 5 main punches are small blocks which may be moved back or forward by the punch selecting solenoids and beneath these blocks in the main punch solenoid. The sprocket hole is of course punched each time the main punch solenoid operates.

The punch circuit

The punch circuit is in two parts, the first consisting of 5 identical modules of which one is shown in FIGURE 11, being indicated by reference CM4A, controlling the punch selecting solenoids and the second being a single module CM5 controlling the main punch solenoid.

Each punch selecting solenoid S1 takes its input, as shown in the drawing, from 6 diodes D2–D7 in parallel, these being feeds from the velocity circuit, the first direction selsyn, the second direction selsyn, the check digit, the parity digit (described below), and the manual controls. Each selection solenoid S1 is in the collector lead of a control transistor T1 the base B1 of which is normally held positive; however, when a negative voltage is supplied via any of the input diodes, the transistor T1 conducts and energises the solenoids. On removal of the negative voltage the transistor T1 opens the solenoid circuit and returns the punch solenoid S1 to its unselected condition. A diode D$t$1 connected across the terminals of the solenoid S1 prevents voltage surges from destroying the transistor T1 as it opens the solenoid circuit.

When any selection solenoid such as S1 closes, an auxiliary contact S$w$ on it also closes and as the five of these contacts on the five solenoids are connected in parallel, the closing of any one or more completes the circuit to the main punch module via a limit contact S$e$ of the main solenoid SM. The main punch module CM5 is similar to the punch selection module CM4A1 except that it has a second stage driven by the first, to handle the larger current required to operate the main solenoid SM. When a negative voltage is fed into this module the two transistors T1, T2 conduct, and the solenoid SM commences to move up towards the punches; it has considerable inertia and this ensures that all selection solenoids have time to move to their correct position and also enables the solenoid to carry through to the end of its stroke after its limit contacts open the circuit to the module.

Toward the end of its stroke an auxiliary contact S$a$ opens; as the solenoid SM returns, it first recloses this contact and feeds a resetting pulse to the shift register in the sequence circuit, so that it steps on to the next function and the punch selection solenoids may start setting up the new digit to be punched. As the solenoid SM continues its return stroke, a mechanical device moves the tape forward one step and then the limit contact S$e$, which re-energises the module, is closed.

Again the inertia of the solenoid SM slows down the start of the next punching sequence and ensures that the selection solenoids are correctly set up before the holes are punched for the next digit.

Parity

As a precaution against accepting false readings the computer is designed to reject all readings which do not have an odd number of holes in the digit punched. This means that should one punch fail to perforate the tape then, rather than the computer accept this wrong reading, it will reject the whole set of readings for that 10 minute period; however, in a simple binary code half of the digits have an even number of holes in the character punched, consequently provision must be built in to the anemometer to punch an additional hole in the 5th row every time a digit would otherwise have an even number of holes. This is done by means of a parity matrix.

The Parity Matrix "looks at" the state of the four least significant punch selector solenoids (numbers 1 to 4) and determines whether an odd or even number is selected (no punches being selected being referred to as an even number). It then provides an input to the fifth selector solenoid if it "sees" an even number selected.

The manual controls

The manual controls consist of an auto/off/manual rotary switch and five push buttons; these are auto test, erase, stop, start and tape feed. The auto test button simply duplicates the action of the main time switch contact and sets the sequence circuit in operation.

This then causes a velocity reading, the two lines of direction reading and a check digit to be punched into the tape. The velocity reading given in this case will not be true wind velocity, for the velocity count has not gone through its full 10 minute cycle. However, by using a stop watch and allowing say one minute between successive operation of the auto test button then a check on the velocity can be made (in this case by multiplying the reading punched by 10).

The auto-manual switch, when switched to manual, disconnects power from both the velocity and direction circuits and the sequence circuit but connects power to the 4 remaining push buttons in order that they may function. Pressing the erase button now feeds negative voltage to each of the transistors controlling the five punch selecting solenoids and at the same time a negative voltage is fed, through a diode, direct to the main punch solenoid so that a line of 5 holes is punched. Normal use of this would be to erase a series of digits which had been punched during testing and adjustment. The procedure would be to manually wind the tape back through all of the digits to be erased and then press the erase button allowing the tape to progress forward punching the erase digit (i.e. 5 holes) over those existing. This means that all of these would finish up with all 5 holes punched and the computer would ignore these readings.

The stop and start buttons are to provide the computer with an instruction to commence reading or stop reading information, i.e. when a tape is fed into the computer it will ignore all readings until it receives a start signal. It will then accept all properly punched readings until a stop signal is recorded and will then ignore all further readings until the next start signal. These buttons are connected directly to the appropriate punch selecting solenoids while their associated diodes actuate the main punch solenoid. The stop button causes a hole to be punched in each of the first, second and fourth rows, while the start button causes holes to be punched in the fourth and fifth rows.

The tape feed button completes a circuit directly on to the limit switch of the main punch solenoid so that the solenoid continues to rise and fall as long as the tape feed button is depressed. In doing so it punches a tape sprocket hole and advances the tape one position each stroke. This button is used mainly at the start of feeding a tape in or at the finish, feeding it out, but may also be used anywhere in the tape to get recent readings well clear of the machine so that they may be read manually.

When any of these four manual buttons are operated punching continues as long as the button is depressed, and the tape steps forward one step with each punching.

*Installation and use of the machine*

The machine is installed in a weatherproof metal cabinet approx. 3 ft. tall by 2 ft. wide and 15" deep. This is divided into two levels, the top level containing the punch and electronic unit and the lower level containing the batteries and tape storage. This cabinet is mounted on 4 metal legs set directly on to the concrete base at the foot of a 30 ft. mast. The mast is of tubular steel construction guyed at 3 levels and at the top of this is the velocity head and direction vane. As mentioned earlier visits will be approximately monthly, when the nickel cadmium batteries will be replaced by a fully charged set and the others returned for recharging. The dry cell of the clock will be replaced and, after pressing the "stop" button, a test unit will be plugged in place of the heads on the mast and a number of check punchings will be made in the tape. An examination of the tape will also be made over the last two or three feet so that a visual check of operation is given. The technician will enter his name, the date, and time of day on the tape. He will check that the time clock is reading correct time and then will restore the controls to auto and press the start button to restart significant readings, having already erased all of his test figures.

The main use of the machine to Department of Civil Aviation at present is for gathering wind information for future planning of runways, sometimes at installations where no aerodrome yet exists. The reason for this is to ensure that the first runway is laid down in such a direction that the aerodrome will be closed to aircraft on a minimum number of occasions due to cross wind; hence the computer is programmed to present the results in the form, percentage of total wind, i.e. it adds up the number of times that the wind blows in any particular direction at any particular velocity, divides this figure into the total number of readings and then expresses it as a percentage. For example, if only 10 readings were read and of these one was 0–6 knots north, two were 6–12 knots north and one was 12–18 knots north, then the percentage of the total wind provided by velocity 0–6 direction north would be 10%, that provided by 6–12 knots north would be 20% and that provided by 12–18 knots north would be 10%; in fact of course thousands of readings are taken and the percentages for each combination of direction-velocity is of the order of 1%.

The cross wind component with respect to any individual direction is then calculated for all of these direction-velocity combinations and the "percentage of total wind" for all which do not exceed the allowable cross wind are then added together and these given the percentage utilization of the runway in that direction for that particular allowable cross wind, i.e. if the direction being considered is north, and the maximum cross wind component allowable is 20 knots, then all of the percentage figures in the north column would be added in, but for those figures relating to 45° from north, (i.e. northeast or northwest) only the percentage figures for velocities which when multiplied by sine 45° are less than 20 knots would have their percentage of total wind added in to the total for direction north.

The computer types these results out in a table, the headings across the page being possible directions of runway, the headings down the page being allowable cross wind component and the figures in this table indicate the percentage of the year on which aircraft would be able to land on a runway in any particular direction for the cross wind the aircraft can tolerate as indicated down the side of the page. The first table printed out would be based on the total readings fed into the machine. Four subsidiary tables would be then printed out, the first indicating figures based on readings taken between dawn and midday, the second on figures taken between midday and dusk, the third based on dusk to midnight and the fourth, midnight to dawn. Of course these are not the only ways in which readings may be analysed and it is expected as the Department becomes more familiar with use of these results it will prepare computer programmes which will make much more detailed examination of the wind conditions over a period; for example, it may wish to have maximum wind velocity extracted or maximum velocities at which the wind blows for periods greater than one hour etc.

While the anemometer in its present form is designed for unattended operation at remote localities, and hence has been limited to gathering only wind speed and direction data (with a minimum current drain so as to increase the length of the permissible periods between maintenance visits), it can easily be extended to perform a great number of additional functions where current consumption is not of major consequence; for example, while the present unit samples wind conditons only each ten minutes, and so would not be suitable for use by control tower personnel, increasing the number of slugs of magnetic material in the rotor of the velocity head increases the pulse rate for a given wind speed, and so samples may be taken much more often. These would be suitable for presenting in the control tower console in digital form. The present head produces approximately one pulse per second at 6 knots and consequently this would not be suitable for sampling each second, but if the pulse rate were increased to, say 8, 16 or 32 pulses per second at 6 knots, then a representative sample could be obtained in one second. The timing device in this case could be a binary counter actuated by a fixed frequency oscillator and samples would be taken for a period slightly greater than a second to coincide with periods of 1 revolution of the head in a 6 knot wind; the common head could feed pulses to both the counter for digital presentation in the tower and also for the ten minute recording on the tape (assuming 16 pulses per revolution of the rotor an additional 4 stages would need to be added to the present 9 stage binary counter).

In addition to wind information, any other information as desired may be recorded on the tape at each ten minute interval. This is facilitated by the sequence circuit being controlled by a shift register, and consequently by adding additional stages to the shift register prior to the final stage a virtually unlimited number of additional pieces of information can be recorded; each extra stage of the shift register comprises only a single module identical with those already existing. Thus the unit may in fact be set up as a self-contained meteorological recording station and such things as temperature, barometer reading, sunshine or cloud, etc. plus time of day and date can easily be injected and recorded on the tape. These and other modifications and variations are accordingly to be construed as being within the spirit and scope of the invention.

We claim:

1. An anemometer comprising a set of rotatable vanes to detect wind speed; an electromagnetic induction type pulse generator driven by the vanes and generating electrical impulses at a rate proportional to the rate of rotation of the vanes; means operable to detect wind direction; means operable to transduce the detected wind direction indications into coded voltages representative of said indications; a single electronic binary counter counting the impulses over predetermined equal and immediately sequential time intervals, constituting programmed periods, in such a way that the number of impulses during each time interval is proportional to the average value of the indications during the respective time interval; recording means operable to record the number of impulses counted and the resolved coded voltages directly on a recording medium suitable for analysis in a digital computer; analyzing circuits operable to resolve the coded voltages to give a representation of the wind direction at the end of each time interval; gating means operable automatically at the end of each counting period to gate the contents of said binary counter and the resolutions of said analyzing circuits to said recording means; and means operable automatically to reset the counter to zero at the end of each programmed period, so that each counter reading is a total for the respective period rather than a progressive total.

2. An anemometer as claimed in claim 1, wherein said means operable to detect wind direction comprises two selsyn transmitters connected to the shaft of the direction vane via a magnetic coupling and linked to a fluid damping device, whereby the selsyn transmitters are caused to follow the mean positions of the direction vane rather than its extreme positions.

3. An anemometer comprising a set of rotatable vanes to detect wind speed; an electromagnetic induction type pulse generator driven by the vanes and operable to generate pulses at a rate proportional to the rate of rotation of the vanes; a pointed direction vane, mounted on a rotatable shaft, to detect wind direction, a pair of selsyn motor transmitters each having three stator windings, the first selsyn transmitter which is coupled to the shaft of the direction vane, while the second selsyn transmitter is coupled thereto through a reduction gear mechanism, whereby alternating and varying voltages are generated in each of the three windings of each selsyn transmitter whenever any movement of the direction vane takes place, the arrangement being such that algebraic signs of the voltages appearing on the windings of the first selsyn transmitter at any given instant, with respect to a reference voltage, provide an indication of the sextant in which the direction vane is pointing at that instant, and the algebraic signs of the voltages appearing on the windings of the second selsyn transmitter at said instant indicate the 10° segment of the said sextant in which the direction vane is the pointing; the selsyn transmitters being connected to the shaft of the direction vane via a magnetic coupling, and being also linked to a fluid damping device, whereby said selsyn transmitters are caused to follow the mean positions of the direction vane rather than its extreme positions; electronic binary counters connected to said pulse generators; coded voltage analyzing circuits connected to said selsyn transmitters; and a series of punches, actuated by the final stages of the binary counters and by the coded voltage analyzing circuits, and operable to punch holes in a computer tape, thereby recording the readings and indications of the anemometer in binary code thereon in a form ready for presentation to a digital computer for analysis.

4. An anemometer as claimed in claim 3, wherein a check digit is also punched in the tape to provide separation between successive readings and indications.

5. An anemometer as claimed in claim 4, wherein the check digit also serves to indicate whether the reading was taken in daylight or in darkness.

6. An anemometer as claimed in claim 5, wherein the check digit character is changed by means of a timing device at midday and midnight, whereby wind speed and direction readings may be separated into four time groups according to when they were recorded by means of their check digits.

7. An anemometer as claimed in claim 3, which also includes a timing device operated sequencing means, which serves to periodically energize the operating elements of the anemometer, so that average wind force readings and wind direction indications for the period since the previous sampling are counted, recorded and punched into the tape.

8. An anemometer as claimed in claim 3, which also includes check means, which provides that each reading punched into the tape contains an even number of holes, whereby the computer processing such a tape can be programmed to reject any reading which contains only an even number of holes as erroneous.

9. An anemometer as claimed in claim 3, wherein overriding manual control switches are provided by means of which the automatic operational sequence of the instrument can be interrupted and/or modified.

10. An anemometer as claimed in claim 3, in which provision is made for instantaneous digital presentation of the readings and indications at a required location.

11. An anemometer comprising a direction vane, mounted on a rotatable shaft, to detect wind direction; means operable to transduce the detected wind direction indications into coded voltages, and including a pair of selsyn motor transmitters each having three stator windings, the first selsyn transmitter being coupled to the shaft of the direction vane, while the second selsyn transmitter is coupled thereto through reduction gear mechanism, whereby alternating and varying voltages are generated in each of the three stator windings of each selsyn transmitter whenever any movement of the direction vane takes place, the arrangement being such that the algebraic signs of the voltages appearing on the windings of the first selsyn transmitter at any given instant, with respect to a reference voltage, provide an indication of the sextant in which the direction vane is pointing at that instant, and the algebraic signs of the voltages appearing on the stator windings of the second selsyn transmitter at said instant indicate the 10° segment of said sextant in which the direction vane is then pointing; means operable to detect wind speed; means operable to transduce, by electromagnetic induction, the indications of detected wind speed into electrical impulses the repetition rate of which is proportional to wind speed; a single electronic binary counter counting the impulses over predetermined time intervals, constituting programmed periods, in such a way that the number of impulses counted during each time interval is proportional to the average value of the indications during the respective time interval; means operable automatically to reset the counter to zero at the end of each programmed period, so that each reading is a total for the respective period rather than a progressive total; analyzing circuits operable to resolve the coded voltages to give a representation of the wind direction at the end of each time interval; and means operable to record the number of impulses counted and the resolved coded voltages directly on a recording medium suitable for analysis in a digital computer.

12. An anemometer, as claimed in claim 7, including a shift register controlling said sequencing means, said shift register including plural stages, in advance of a final stage, and connected to said binary counters and to said coded voltage analyzing circuits; said shift register including at least one further stage in advance of its final stage for the measurement and recording of additional information on the tape.

References Cited by the Examiner

UNITED STATES PATENTS

| | | | |
|---|---|---|---|
| 2,191,955 | 2/1940 | Chappell et al. | 73—189 |
| 2,391,601 | 12/1945 | Thomas et al. | 73—189 |
| 3,069,907 | 12/1962 | Eddy | 73—229 |
| 3,119,260 | 1/1964 | Karmin | 73—189 |
| 3,138,425 | 6/1964 | Pitts | 346—50 |

FOREIGN PATENTS 451,372  9/1948  Canada.

RICHARD C. QUEISSER, *Primary Examiner.*

J. J. SMITH, *Assistant Examiner.*